US008811766B2

(12) United States Patent
Raffalli et al.

(10) Patent No.: US 8,811,766 B2
(45) Date of Patent: Aug. 19, 2014

(54) PERCEPTUAL BLOCK MASKING ESTIMATION SYSTEM (75) Inventors: Anna Raffalli, Grenoble (FR); Haiyun Wang, Singapore (SG); Lucas Hui, Singapore (SG); Patricia Wei Yin Chiang, Singapore (SG)

(73) Assignees: STMicroelectronics Asia Pacific Pte. Ltd., Singapore (SG); STMicroelectronics (Shenzhen) R&D Co., Ltd., Nanshan, Shenzhen (CN)

( * ) Notice: Subject to any disclaimer, the term of this patent is extended or adjusted under 35 U.S.C. 154(b) by 119 days.

(21) Appl. No.: 13/332,949

(22) Filed: Dec. 21, 2011

(65) Prior Publication Data

US 2012/0170864 A1 Jul. 5, 2012

(30) Foreign Application Priority Data

Dec. 30, 2010 (CN) .......................... 2010 1 0625165

(51) Int. Cl.
G06K 9/40 (2006.01)
H04N 7/26 (2006.01)
(52) U.S. Cl.
CPC ... *H04N 19/00066* (2013.01); *H04N 19/00909* (2013.01); *H04N 19/00157* (2013.01)
USPC ......................................... 382/266; 382/254
(58) Field of Classification Search
USPC ......... 382/199, 224, 232, 251, 260–266, 275; 375/240.24, 240.29
See application file for complete search history.

(56) References Cited

U.S. PATENT DOCUMENTS

| 5,517,581 | A  | * | 5/1996  | Johnston et al. | ............... 382/232 |
| 5,699,119 | A  | * | 12/1997 | Chung et al.    | ............. 375/240.04 |
| 5,990,957 | A  | * | 11/1999 | Ryoo            | ........................ 375/240.03 |
| 6,668,097 | B1 | * | 12/2003 | Hu et al.       | ........................ 382/275 |
| 6,944,224 | B2 | * | 9/2005  | Zhao et al.     | ............... 375/240.16 |
| 7,289,676 | B2 | * | 10/2007 | Sugiyama        | ..................... 382/239 |
| 8,295,633 | B2 | * | 10/2012 | Sangkeun et al. | ............ 382/268 |
| 2004/0114816 | A1 | * | 6/2004 | Sugiyama       | ..................... 382/239 |
| 2004/0120597 | A1 |   | 6/2004 | Dinh et al. | |

(Continued)

FOREIGN PATENT DOCUMENTS

EP            1 083 751       *  3/2001

OTHER PUBLICATIONS

Ling Shao; Jingnan Wang; Kirenko, I.; de Haan, G., "Quality adaptive trained filters for compression artifacts removal," Acoustics, Speech and Signal Processing, 2008. ICASSP 2008. IEEE International Conference on , vol., No., pp. 897,900, Mar. 31, 2008-Apr. 4, 2008.*

(Continued)

*Primary Examiner* — Andrae S Allison
(74) *Attorney, Agent, or Firm* — Wolf, Greenfield & Sacks, P.C.

(57) ABSTRACT

Systems and methods are disclosed for determining the perceptibility of noise in a block of images and/or video. The systems and methods may compute a mask value for the block using a block masking generator. The mask value may indicate the perceptibility of noise in the block. The mask value may be computed using a normalized activity value and/or a texture value for the block. The normalized activity value may indicate the relative activity in the block as compared to the activity in the image and/or video. The texture value may indicate the strength and/or number of edges in the block.

30 Claims, 9 Drawing Sheets

(56) References Cited

U.S. PATENT DOCUMENTS

| | | | |
|---|---|---|---|
| 2007/0237241 A1* | 10/2007 | Ha et al. | 375/240.27 |
| 2009/0268981 A1* | 10/2009 | Lu et al. | 382/275 |
| 2010/0165207 A1* | 7/2010 | Deng et al. | 348/620 |
| 2012/0133836 A1 | 5/2012 | Raffalli et al. | |
| 2013/0128122 A1* | 5/2013 | Wang et al. | 348/607 |

OTHER PUBLICATIONS

Bhat et al, A New Perceptual Quality Metric for Compressed Video, IEEE Transactions on Image Rocessing Apr. 2009.*

Ninassia et al, On the Performance of Human Visual System Based Image Quality Assessment Metric Using Wavelet Domain, SPIE Conference Human Vision and Electronic Imaging XIII, San Jose : United States (2008).*

Liu et al, A Perceptually Relevant Approach to Ringing Region Detection, IEEE Transactions on Image Processing, vol. 19, No. 6, Jun. 2010.*

Chou, Chun-Hsien et al., "A Perceptually Tuned Subband Image Coder Based on the Measure of Just-Noticeable-Distortion Profile," IEEE Transactions on Circuits and Systems for Video Technology, Dec. 1995, p. 467-476, vol. 5, No. 6.

* cited by examiner

PERCEPTUAL BLOCK MASKING ESTIMATION SYSTEM

CROSS REFERENCE TO RELATED APPLICATIONS

This application claims the priority benefit of Chinese patent application number 201010625165.X, filed on Dec. 30, 2010, entitled PERCEPTUAL BLOCK MASKING ESTIMATION SYSTEM, which is hereby incorporated by reference to the maximum extent allowable by law.

BACKGROUND OF THE INVENTION

1. Field of Invention

The techniques described herein relate generally to determining the perceptibility of noise in images. Noise reduction techniques may be applied based on the perceptibility of the noise.

2. Discussion of the Related Art

Digital images and video may be transmitted over a channel in numerous applications, for example, the transmission of digital television signals. In some applications, the digital images and video may be compressed before transmission to increase the amount of information that may be transmitted. For example, if digital television signals are compressed, a greater number of television channels may be transmitted than without compression.

The compression of digital images and video may be lossless or lossy. Where the compression is lossless, the original images or video may be exactly reproduced after decompressing the data. Where the compression is lossy, however, the original images or video may not be reproduced exactly, and may have "noise" caused by the lossy compression algorithm. In some applications, lossy compression may be preferred to lossless compression because the compression rates may be greater.

The compression of images and video may add different types of noise. One example of noise is "blocking" noise. An image or frame of video may be divided into a plurality of blocks. Some compression algorithms, such as MPEG, may process blocks of image and video, and differing effects around block borders may cause noise to appear. Other types of noise that may occur include "ringing" and "mosquito" noise. Ringing and mosquito noise may appear near sharp edges in an image and may create noisy artifacts that extend spatially and/or temporally away from a sharp edge.

In some applications, techniques may be applied to reduce the appearance of decompression noise. For example, filters may be use to reduce ringing noise in images and video. Applying techniques to reduce noise, however, may also adversely affect the non-noisy portions of an image or video. For example, using a filter to reduce noise can blur regions of an image and reduce the quality with which the details of an image can be reproduced.

BRIEF DESCRIPTION OF DRAWINGS

In the drawings, each identical or nearly identical component that is illustrated in various figures is represented by a like reference character. For purposes of clarity, not every component may be labeled in every drawing. In the drawings.

DETAILED DESCRIPTION

The strength of a filter applied to reduce noise in an image can be chosen based on the amount of noise in an image. For example, where an image contains a lot of noise, a stronger filter may be applied, and where an image contains a small amount of noise, a weaker filter may be applied. Applying a stronger filter to reduce noise, however, may also have greater undesirable effects on the portions of an image and video that do not contain noise.

Applicants have appreciated that although the lossy compression of images and video may add noise to the decompressed images and video, the noise that appears in the images and video may not always be perceptible to people viewing them. For example, where an image or video shows a grassy field, the texture of the image may obscure noise that is present in the image, and it may not be necessary to apply techniques to reduce the appearance of the noise. By contrast, where an image or video contains a sharp edge adjacent to a smooth region, the noise may be clearly visible, and it may be more desirable to apply techniques to reduce the appearance of noise. The techniques described herein relate to improving the appearance of digital images and video by reducing or removing noise.

In some embodiments, a noise perceptibility value may be computed for a block indicating how perceptible the noise is in the block. In some embodiments, a normalized activity calculator and a texture analyzer may be used to determine the noise perceptibility value for a block. The noise perceptibility value may be used as a mask value that can be used to set the strength of a spatial de-noising filter used to filter the image.

The calculated activity level can represent the complexity of the visual content within a portion of an image. For example, a portion of an image without significant details, such as a background portion of an image, may have a low activity level while a complex frame with a significant amount of detail may have a high activity level. A normalized activity level can be calculated as a relative value that represents the activity level of a portion of a frame, such as a block, compared with the activity level of the frame as a whole.

In some embodiments, the normalized activity calculator may compute the normalized activity using similar techniques as are used by an MPEG encoder. In an MPEG encoder, the normalized activity level may be used to determine the size of the quantization steps to use during encoding. The normalized activity may be determined by comparing the activity of a particular block with the activity of a frame. In an MPEG encoder, where the activity level is high the quantization steps used to encode the block can be made large. If the activity level is low the quantization steps used to encode the block can be made smaller to reduce the amount of noise. The normalized activity level calculator can use these techniques to estimate the amount of activity in a block, in some embodiments. When the activity level is high, noise that may be introduced due to compression may not be as perceptible due to the high amount of activity in the block. When the activity level is low, noise that may be introduced due to compression may be more perceptible. The strength of a spatial de-noising filter used to process the decompressed image can be selected based upon the calculated activity value.

A texture analyzer may compute a texture value for a block. The texture of a block can be considered to be the amount of non-random or ordered spatial information in the block. When the texture level is high, noise that may be introduced due to compression may not be as perceptible due to the high amount of texture in the block. When the texture level is low, noise that may be introduced due to compression may be more perceptible. In some embodiments, the amount of ordered spatial information in a block can be calculated using spatial filters designed to detect edges in a block. The calculated texture value can be affected by the strength and/or number of edges in the block. Where a block contains many edges, the texture value of the block may be high, and where the block does not contain many edges, the texture value of the block may be low. The strength of a spatial de-noising filter used to process the decompressed image can be selected based upon the calculated texture value.

In some embodiments, a block masking generator may receive as input a normalized activity value and a texture value and generate as output a noise perceptibility value. The noise perceptibility value may be a mask value used to control the strength of the spatial de-noising filtering to be applied.

Figure 1:
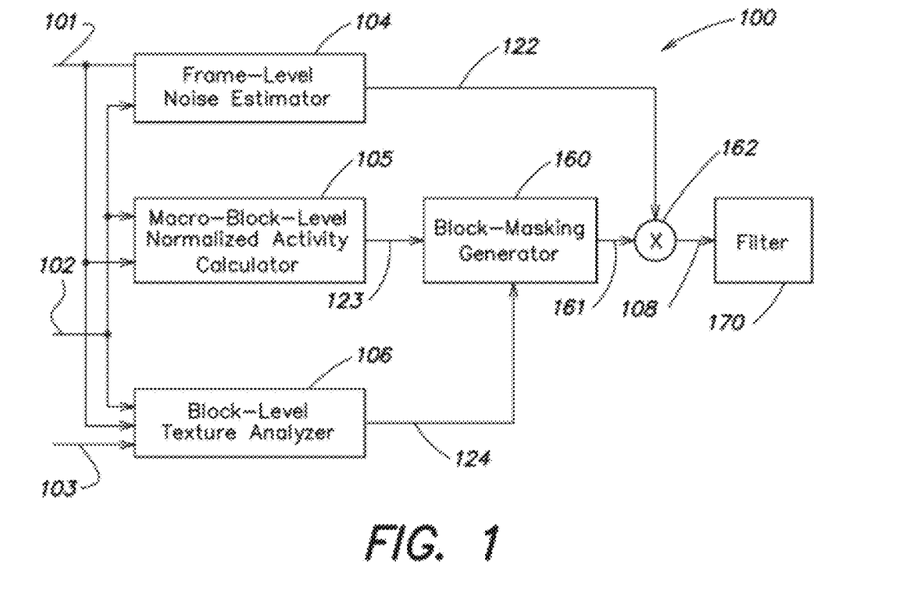
FIG. 1 shows an exemplary implementation of a system that may be used to determine the perceived noise in a block of an image.

FIG. 1 shows an embodiment of system 100 that may be used to reduce or remove noise from a frame. System 100 may have three inputs. A first input may be a frame 101. Frame 101 may be in any format, and in some embodiments frame 101 may include only the luminance component of a frame. Another input may be block parameters 102. Frame 101 may be subdivided into blocks and macro blocks, and block parameters 102 may include data representing the width and height of the blocks and/or the locations of the blocks within frame 101. In some embodiments, a block may be an eight-by-eight square of pixels, and a macro block may be a larger two-by-two square of blocks, but the configuration of blocks and macro blocks is not a limiting feature of the invention. Another input may be an interlace flag 103, which may indicate whether or not the frame data is interlaced.

In some embodiments of system 100, some processing may be performed on frame 101, some processing may be performed on a macro block of frame 101, and some processing may be performed on a block of frame 101. For example, system 100 may include a frame-level noise estimator 104 that produces a frame-noise estimate 122 that may indicate the amount of noise in frame 101. System 100 may also include a macro-block-level normalized activity calculator 105 that produces a macro-block normalized activity value 123, and may use similar techniques as used by an MPEG encoder. System 100 may also include a block-level texture analyzer 106 that produces a block texture value 124 using techniques such as computing the average value of edges in a block. In system 100, a block masking generator 160 may receive as inputs a macro-block normalized activity value 123 and a block texture value 124 and use those values to create a block mask value 161. In some embodiments, block masking generator 160 may use a lookup table to compute block mask value 161.

The frame-noise estimate 122 and block mask value 161 may be used to determine the strength of a de-noising filter to be applied to a block. For example, in some embodiments, a filter-strength parameter 108 may be determined by using a multiplier 162 that multiplies the frame-noise estimate 122 and block mask value 161. The filter-strength parameter 108 may then be used to determine the filter coefficients of filter 170, and filter 170 may be used to reduce or remove the noise present in a block.

Figure 2:
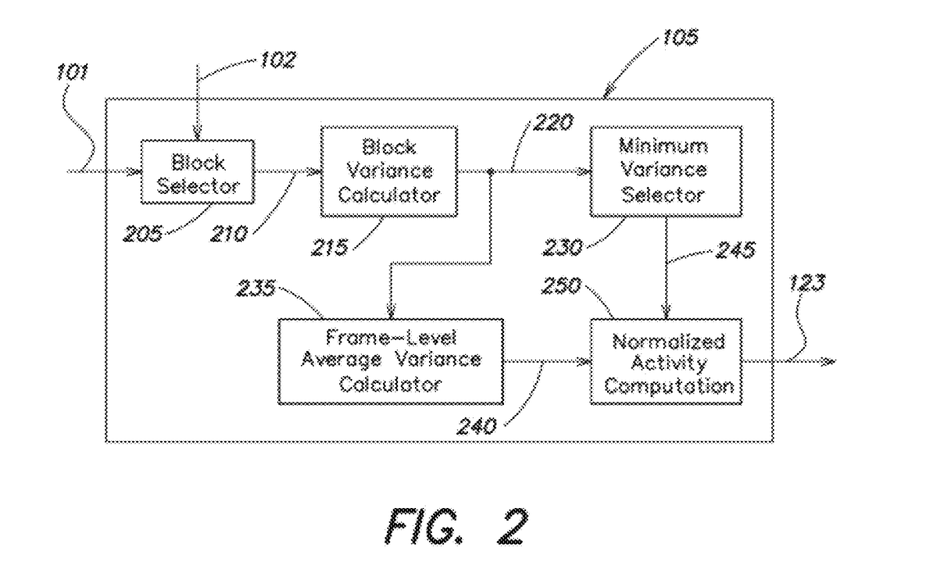
FIG. 2 shows an exemplary implementation of a macroblock-level normalized activity calculator in accordance with some embodiments.

One example of macro-block-level normalized activity calculator 105 that may be used with system 100 is shown in FIG. 2. In FIG. 2, block selector 205 receives as inputs frame 101 and block parameters 102, and generate as outputs a block 210 from frame 101. For example, in some embodiments, block 210 may be an eight-by-eight square of pixels from 101. Next, block variance calculator 215 computes the block variance 220 of block 210, where block variance 220 indicates a measure of the variance of the values of the pixels in block 201. The block variance 220 may be computed in any suitable way. For example, block variance 220 may be computed using the following equations:

$$\text{average} = \frac{1}{NumPix} \sum_{k=1}^{NumPix} (P_k)$$

$$\text{block variance} = \frac{1}{NumPix} \sum_{k=1}^{NumPix} (P_k - \text{average})^2$$

where NumPix is the total number of pixels in the block and $P_k$ is pixel k of the block.

Block variance 220 may be used by frame-level average variance calculator 235 to compute frame average variance 240, which may be the average value of block variance 220 over some number of blocks in frame 101. Frame average variance 240 may be computed in any suitable way. For example, frame average variance 240 may be computed using the following equation:

$$\text{frame average variance} = \frac{1}{NumBlk} \sum_{k=1}^{NumBlk} (BlkVar_k)$$

where NumBlk is the number of blocks used to compute frame average variance 240 and $BlkVar_k$ is block variance 220 for block k of frame 101.

Figure 3A:
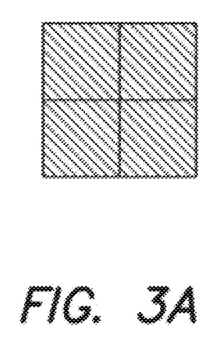
FIG. 3 shows examples of configurations of blocks that may be used by a macro-block-level normalized activity calculator in accordance with some embodiments.
Figure 3B:
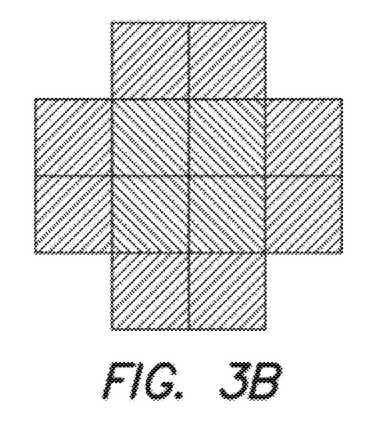

Block variance 220 is also used by minimum variance selector 230 to compute a minimum variance 245 over a set of blocks. The set of blocks considered by minimum variance selector 230 may be related to a macro block that includes block 210. For example, in some embodiments minimum variance selector 230 may select the minimum variance over the blocks in the macro block containing block 210. Where a macro block consists of four blocks, minimum variance selector 230 may select the minimum variance over four blocks as shown in FIG. 3a. In other embodiments, minimum variance selector 230 may select the minimum variance over the blocks in the macro block containing block 210 and also blocks adjacent to the macro block as shown in FIG. 3b. In other embodiments, minimum variance selector 230 may set minimum variance 245 to zero regardless of the actual values of block variances.

Normalized activity computation unit 250 may compute macro-block normalized activity value 123 using frame average variance 240 and minimum variance 245. Macro-block normalized activity value 123 may be computed in any suitable way. In some embodiments, macro-block normalized activity value 123 may be computed using the following formula:

$$\text{marco-block normalized activity} = \frac{2*(1+\text{MinVar})+\text{AvgVar}}{(1+\text{MinVar})+2*\text{AvgVar}} \times 128$$

where MinVar is minimum variance 245 and AvgVar is frame average variance 240. In computing macro-block normalized activity value 123, the frame average variance 240 may be from the current frame or may be from another frame, such as a previous frame.

In some embodiments, macro-block-level normalized activity calculator 105 may be the same as or similar to a portion of the encoder used to compress the original signal and create frame 101. Applicants have appreciated that computing macro-block normalized activity value 123 in a manner that is the same as or similar to the encoder used to create frame 101 may improve the performance of system 100 because the activity level computed during encoding may be a good indicator of the perceptibility of noise in the compressed image. Applicants have further appreciated that during encoding of a block, the greater the activity level of the block, the less likely it is that any noise added to the block during the compression process will be perceptible. Accordingly, where a block is more active, the quantization steps can be made larger since the noise may not be perceptible. Similarly, during encoding of a block, the lower the activity level of the block, the more likely it is that any noise added to the block during the compression process will be perceptible. Accordingly, where a block is less active, smaller quantization steps may be used to encode the block since the noise may be perceptible. Applicants have appreciated that the same activity level used during encoding may also be used after decoding to determine how perceptible compression noise may be in a block.

Figure 4:
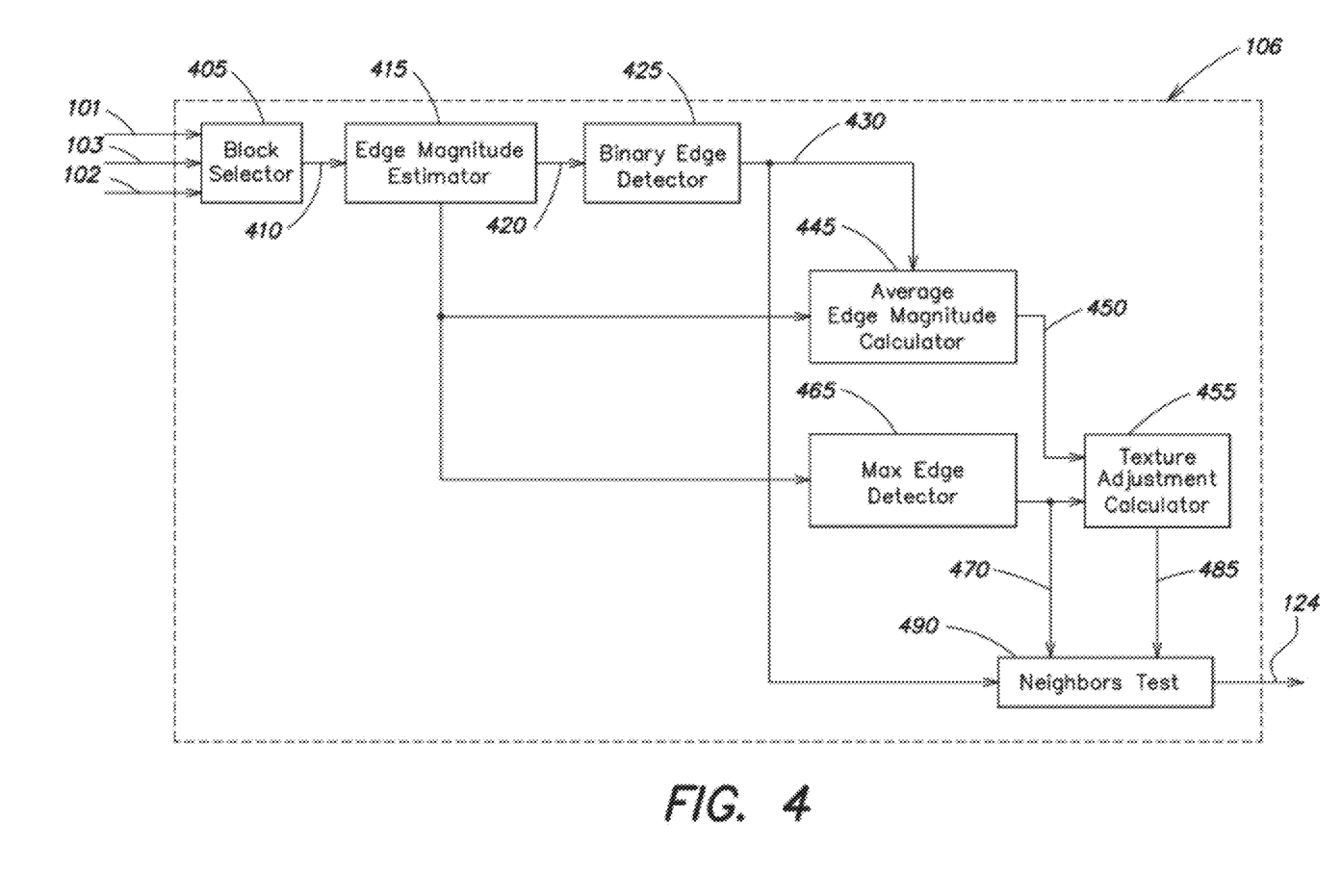
FIG. 4 shows an exemplary implementation of a block-level texture analyzer in accordance with some embodiments.

One example of block-level texture analyzer 106 that may be used with system 100 is shown in FIG. 4. In FIG. 4, block selector 405 receives as inputs frame 101, block parameters 102, and interlace flag 103. Block selector 405 outputs a block 410 from frame 101, and depending on the value of interlace flag 103, may deinterlace the data for the block. For example, in some embodiments, block 410 may be an eight-by-eight square of pixels from 101, that may or may not be interlaced.

Edge magnitude estimator 415 receives block 410 and computes an estimate of the edge magnitude 420 at each pixel of block 410. Edge magnitude 420 may indicate how different a pixel is from neighboring pixels. For example, where a pixel has the same value as all of its neighbors, the pixel may have an edge magnitude of zero. By contrast, where the value of a pixel differs greatly from some or all of its neighbors, the edge magnitude may have a large value.

Figure 5A:
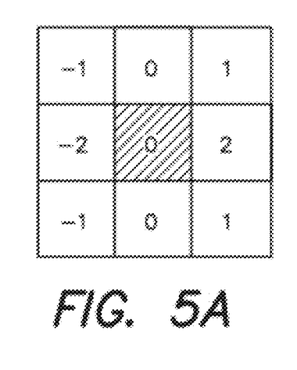
FIG. 5 shows exemplary matrices that may be used to determine edge magnitudes in accordance with some embodiments.
Figure 5B:
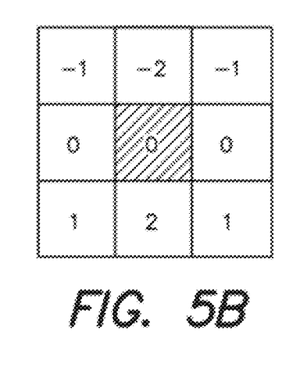

Edge magnitude estimator 415 may compute the edge magnitude in any suitable way. For example, in some embodiments, a Sobel operation may be performed on block 410 using the following equations for each pixel of block 410:

$$G_x = \sum_{j=1}^{9} m_{jx} \times P_j$$

$$G_y = \sum_{j=1}^{9} m_{jy} \times P_j$$

$$EdgeMag = |G_x| + |G_y|$$

where $m_{jx}$ represents the values in the matrix in FIG. 5a, $m_{jy}$ represents the values in the matrix in FIG. 5b, and $P_j$ represents the current pixel and the eight surrounding pixels. In computing the edge magnitude of block 410 at the boundary of block 410, any suitable method may be used. In some embodiments, the boundary pixels of the block may be repeated, while in other embodiments the actual values of the pixels adjacent to block may be retrieved and used in computing the edge magnitude.

From edge magnitude 420, the pixels of the block may be classified as having different textures. Where edge magnitude 420 is greater than a specified threshold, the pixels of the block may be classified as corresponding to an edge, but where edge magnitude 420 is less than the specified threshold, the pixels of the block may be classified as a non-edge region. In a non-edge region, the pixels may further be classified as being in a textured region or in a flat region depending on the values of edge magnitude 420 in that region.

Binary edge detector 425 may be used to determine whether pixels of a block correspond to an edge region or a non-edge region. Any suitable method may be used to determine whether a pixel corresponds to an edge region or a non-edge region. For example, in one embodiment, a pixel may be classified as an edge region if the edge magnitude for that pixel is greater than a specified value or if any pixel in a three-by-three window surrounding that pixel is greater than a specified value. Binary edge detector 420 may generate as output an edge map 430 where the value in the map is zero if the pixel corresponds to an edge region and the value in the map is one if the pixel corresponds to a non-edge region.

Average edge magnitude calculator 445 may provide a preliminary block texture value 450 using edge map 430 and edge magnitude 420. Any suitable method may be used to compute preliminary block texture 450. For example, in one embodiment, average edge magnitude calculator 445 may compute the average value of edge magnitude 420 over the pixels of block 410 where the pixels have been classified as non-edge pixels in edge map 430. In this embodiment, preliminary block texture value 450 may have a smaller value for a flat region and a higher value for a textured region.

Maximum edge detector 465 may compute the maximum value of edge magnitude 420, which may be denoted as maximum edge 470. Applicants have appreciated that the value of the maximum edge in block 410 may be used to refine a texture estimate for the block. For example, where maximum edge 470 is a large value, the noise level in block 410 may be high due to the presence of a steep edge. In determining whether block 410 corresponds to a smooth region or a textured region, the presence of noise in a smooth region of block 410 could be falsely identified as texture in the block. By considering the value of the maximum edge 470 in block 410, a better estimate of the texture of the block may be obtained.

Texture adjustment calculator 455 may be used to adjust the value of preliminary block texture value 450 using maximum edge 470, and the output of texture adjustment calculator 455 may be denoted as adjusted texture value 485. Any suitable method may be used to adjust the value preliminary block texture 450 using edge magnitude 420. In one embodiment, texture adjustment calculator 455 may use the following equation to adjust the value of preliminary block texture value 450:

$$AdjTextureValue = (1-(1-MaxEdgeAdj) \times (1-AvgEdjAdj)) \times TextureValue$$

where TextureValue is preliminary block texture value 450, AdjTextureValue is adjusted texture value 485, and MaxEdgeAdj and AvgEdgeAdj are parameters that may be used to adjust preliminary block texture value 450.

Figure 6A:
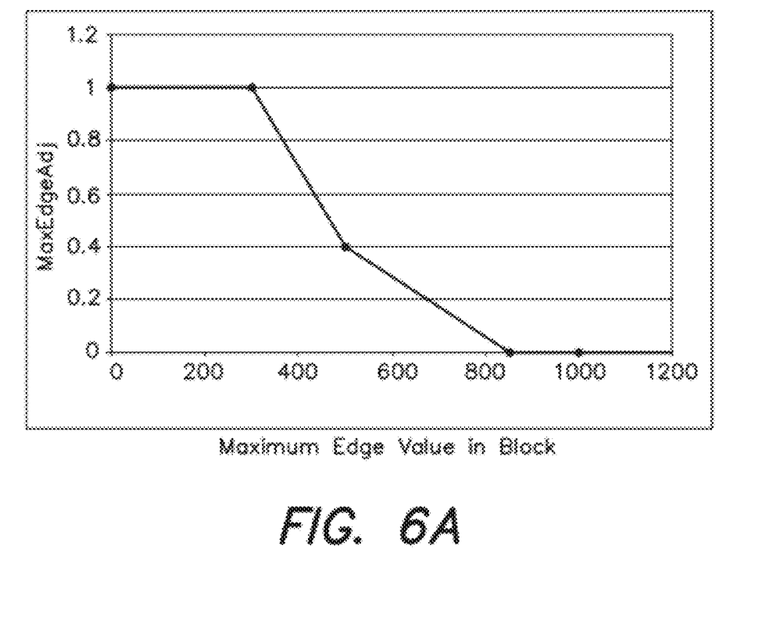
FIG. 6 shows exemplary graphs showing values that may be used to adjust a preliminary block texture value in accordance with some embodiments.

Applicants have appreciated that the parameter MaxEdgeAdj may be used to adjust preliminary block texture value 450 based on the value of maximum edge 470. As explained above, where maximum edge 470 is large, the noise induced by the edge may be falsely identified as texture in the block. The parameter MaxEdgeAdj may be used to reduce the texture value where there is a steep edge to help prevent noise from being falsely identified as texture. In some embodiments, the parameter MaxEdgeAdj may be determined using a chart, such as the chart of FIG. 6a. The x-axis of FIG. 6a corresponds to the value of maximum edge 470, and the y-axis of FIG. 6a represents the corresponding value of MaxEdgeAdj. Where maximum edge 470 is small, the value of MaxEdgeAdj will be one; where maximum edge 470 is large, the value of MaxEdgeAdj will be zero; and for intermediate values of maximum edge 470, the value of MaxEdgeAdj will be between zero and one. However, it should be appreciated that the values of MaxEdgeAdj may be selected differently depending on the particular implementation in which the techniques described herein are used.

Figure 6B:
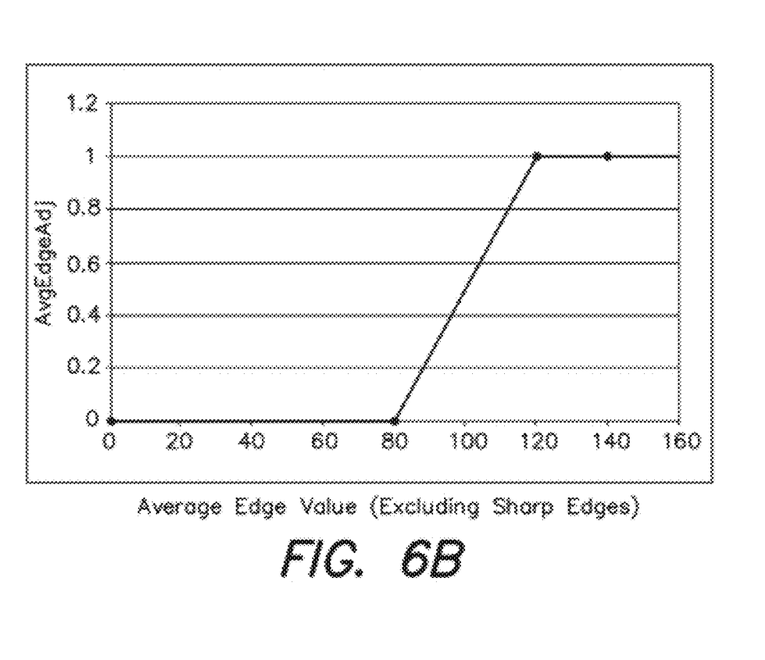

Applicants have further appreciated that the parameter AvgEdgeAdj may also be used to moderate the adjustment induced by the parameter MaxEdgeAdj. Where preliminary block texture value 450 has a larger value, it may be more likely that texture is actually present in the block and less likely that noise has been falsely identified as texture. Any adjustment to the texture value performed by the value MaxEdgeAdj may be moderated where preliminary block texture value 450 has a high value. In some embodiments, the value of AvgEdgeAdj may be determined using a chart, such as the chart of FIG. 6b. The x-axis of FIG. 6b corresponds to preliminary block texture value 450 and the y-axis of FIG. 6b represents the corresponding value of AvgEdgeAdj. In FIG. 6b, where preliminary block texture value 450 is small, the value of AvgEdgeAdj will be zero; where preliminary block texture value 450 is large, the value of AvgEdgeAdj will be one; and for intermediate values of preliminary block texture value 450, the value of AvgEdgeAdj will be between zero and one. The value of AvgEdgeAdj may thus be used to moderate the effect of the value of MaxEdgeAdj where preliminary block texture value 450 has a larger value. However, it should be appreciated that the values of AvgEdgeAdj may be selected differently depending on the particular implementation in which the techniques described herein are used.

Neighbors test 490 may be used to further refine the value of adjusted texture value 485. Neighbors test 490 takes as inputs adjusted texture value 485, edge map 430, and maximum edge 470, and outputs block texture value 124. Neighbors test 490 may consider the texture and maximum edge of adjacent blocks in determining the texture of the current block.

Applicants have appreciated that in certain instances, the texture estimate for an adjacent block may provide a better texture estimate for the current block than adjusted texture value 485. For example, where the current block has a steep edge, adjusted texture value 485 may not provide an accurate estimate of the block's texture, even though texture adjustment calculator 455 attempts to correct any inaccuracies that may be caused by steep edges. Applicants have appreciated that where there is not an edge between a block and an adjacent block, the texture of the two blocks are likely to be similar. Accordingly, where maximum edge 470 of an adjacent block is less than maximum edge 470 of the current block, the adjacent block may have a more accurate texture estimate for the current block.

Figure 8:
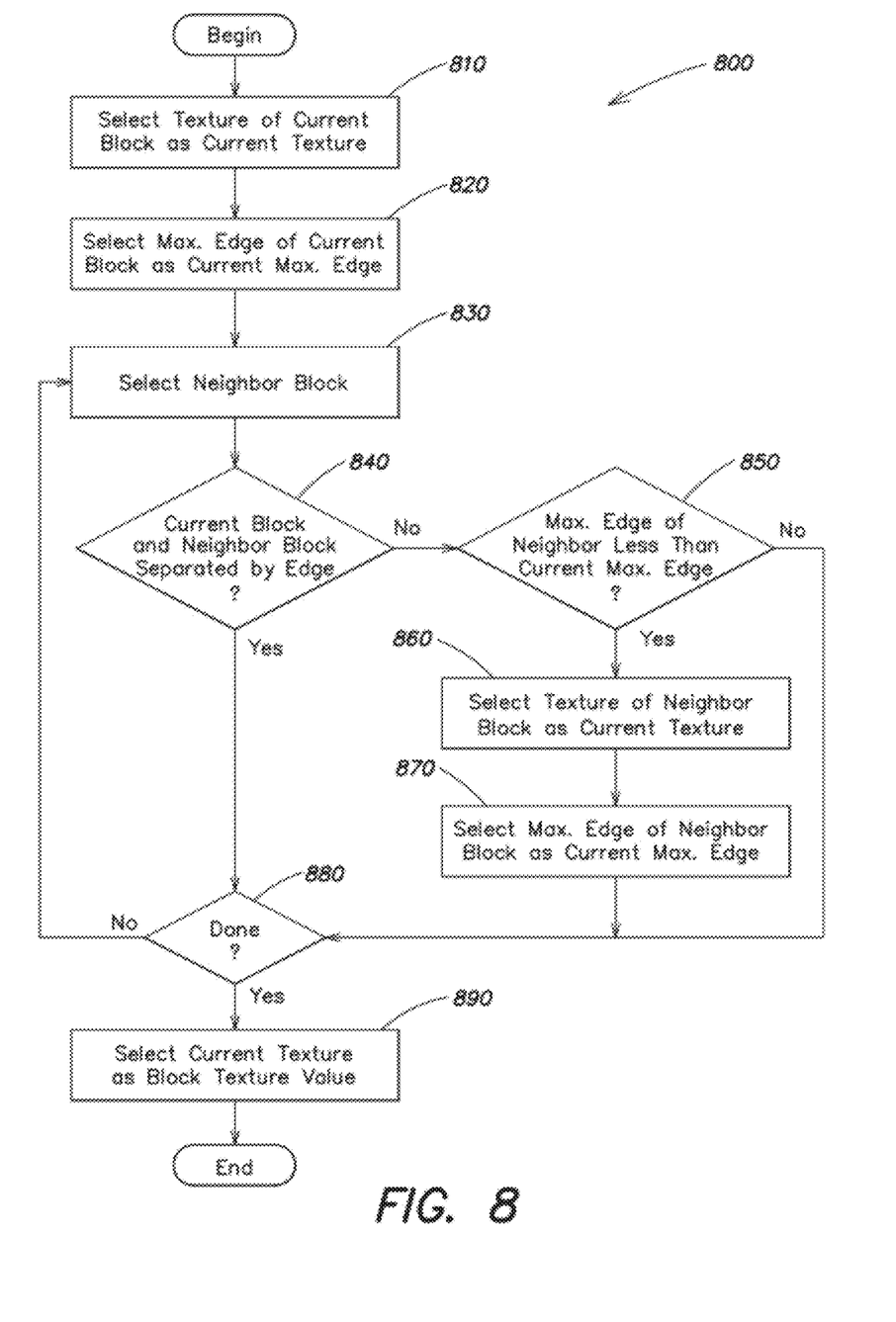
FIG. 8 is a flow chart of an illustrative process that may be used by a block-level texture analyzer in analyzing the texture of neighboring blocks in accordance with some embodiments.

In one embodiment, neighbors test 490 may operate according to the process of FIG. 8. The process of FIG. 8 begins at act 810, where adjusted texture value 485 of the current block is selected as the current texture. The process continues to act 820 where maximum edge 470 of the current block is selected as current maximum edge.

Figure 7:
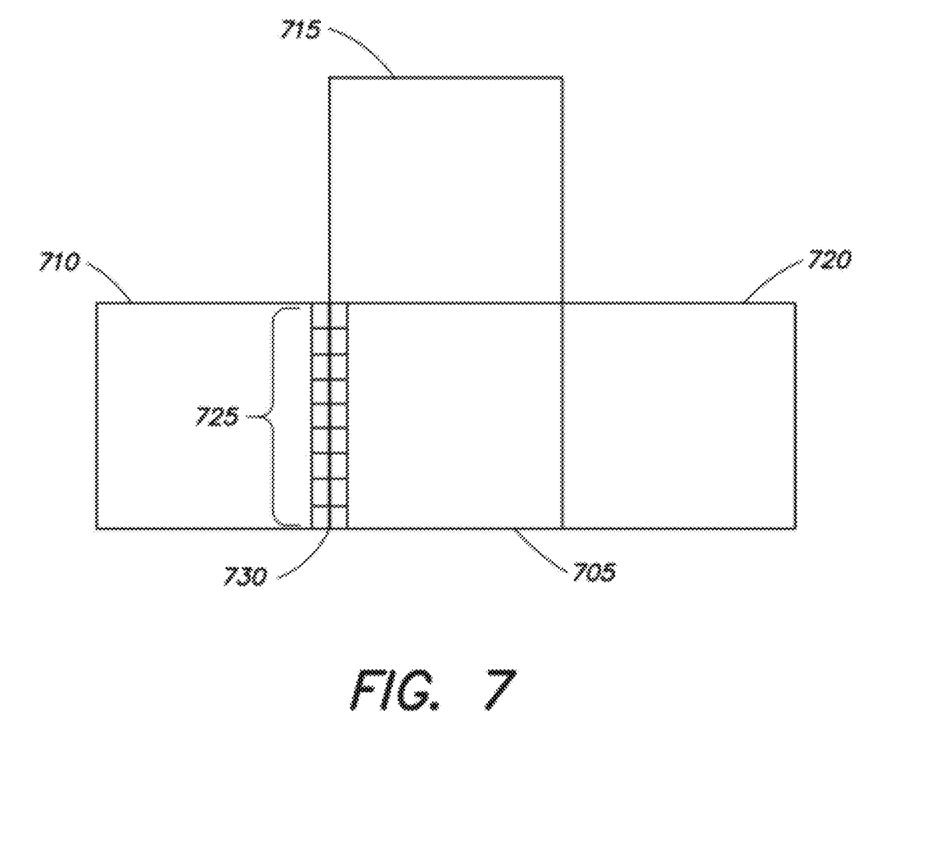
FIG. 7 shows an exemplary configuration of blocks that may be used by a block-level texture analyzer in analyzing the texture of neighboring blocks in accordance with some embodiments.

The process continues to act 830 where a neighbor block of the current block is selected. In some embodiments, the neighbor block may be selected from one of the four blocks that are above, below, left, or right of the current block. In some embodiments, as shown in FIG. 7, the neighbor block may be selected from the blocks that are above 715, left 710, or right 720 of current block 705. By not considering the block below the current block as a neighbor block, advantages in processing may be obtained where the blocks are processed row-by-row to avoid considering blocks in three different rows at the same time.

The process continues to act 840 where it is determined whether the current block and the neighbor block are separated by an edge. This determination may be performed in any suitable way. In one embodiment, this determination may be performed by examining pairs of pixels straddling the border between the current block and the neighbor block as showing in FIG. 7. For example, in FIG. 7 current block 705 and neighbor block 710 are separated by border 730. Where blocks are eight-by-eight squares of pixels, there will be eight pairs of pixels straddling the border between the current block and the neighbor block. Whether any pixel is an edge may be determined by edge map 430. In one embodiment, act 840 will determine that current block 705 and neighbor block 710 are not separated by an edge if there is any one pair of pixels 725 such that both pixels in the pair are not edges, and will determine that current block 705 and neighbor block 710 are separated by an edge if at least one pixel in each pair of pixels 725 is an edge.

If current block 705 and neighbor block 710 are not separated by an edge, then the process continues to act 850, where it is determined if maximum edge 470 of neighbor block is less than maximum edge 470 of current block. If maximum edge 470 of neighbor block is less than maximum edge 470 of current block, then adjusted texture value 485 of neighbor block may be a better estimate of the texture of the current block than adjusted texture value 485 of current block, and the process proceeds to acts 860 and 870. At act 860, the current texture is set to adjusted texture value 485 of neighbor block, and at act 870 the current maximum edge is set to maximum edge 470 of neighbor block.

If maximum edge 470 of neighbor block is greater than maximum edge 470 of current block, then adjusted texture value 485 of neighbor block may not be a better estimate of the texture of the current block than adjusted texture value 485 of current block, and the process proceeds to act 880.

Returning to act 840, if it is determined that current block and neighbor block are separated by an edge, the process proceeds to act 880.

At act 880, it is determined whether additional neighbor blocks remain to be processed. If a neighbor block remains to be processed, the process proceeds to act 830 where another neighbor block is selected. If no more neighbor blocks remain to be processed, the process proceeds to act 890.

At act 890, block texture value 124 of the current block is set to the current texture as determined by process 800. At act 890, current texture may be adjusted texture value 485 of the current block or may be adjusted texture value 485 of one of the neighbor blocks. Returning to FIG. 4, neighbors test 490 outputs block texture value 124.

Returning to FIG. 1, block masking generator 160 receives macro-block normalized activity value 123 from macro-block normalized activity calculator 123 and receives block texture value 124 from block-level texture analyzer 106. Block masking generator 160 outputs block mask value 161, which may indicate how perceptible the noise is in the current block. Any suitable method may be used to compute block mask value 161 from macro-block normalized activity value 123 and block texture value 124.

In one embodiment, block masking generator 160 may operate to produce a block mask value 161 that is similar to the normalized activity level that would have been produced for the block during the encoding of the original frame before the original frame was compressed and transmitted. In one embodiment the thresholds and region values of FIG. 9 may be selected so that block mask value 161 output by block masking generator 160 is similar to the normalized activity level for the corresponding block during the encoding process. Applicants have appreciated that selecting a block mask value 161 that is similar to the normalized activity level for the corresponding block during the encoding process may be effective in determining whether noise is perceptible in the block.

Figure 9:
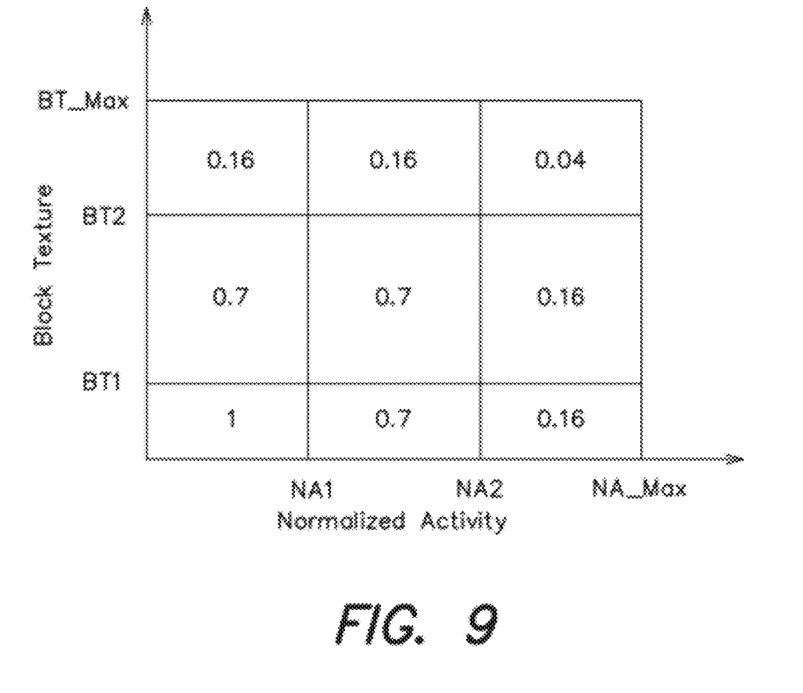
FIG. 9 shows an exemplary lookup table that may be used by a block masking generator in accordance with some embodiments.

In one embodiment, block masking generator 160 may use a lookup table to produce block mask value 161 from macro-block normalized activity value 123 and block texture value 124. FIG. 9 shows one example of a lookup table that may be used with block masking generator 160. In FIG. 9, the x-axis represents possible values of macro-block normalized activity value 123 and the y-axis represents possible values of block texture value 124. In FIG. 9, the x-axis and y-axis are each broken down into three regions but any number of regions may be used for each axis. Thresholds may be set to delineate the regions for macro-block normalized activity value 123 and block texture value 124. For example, in FIG. 9, the three regions for macro-block normalized activity value 123 are between 0 and NA1, between NA1 and NA2, and between NA2 and NA_Max, and the three regions for block texture value 124 are between 0 and BT1, between BT1 and BT2, and between BT2 and BT_Max. The three regions on each axis create a total of nine regions for possible values of block mask value 161. In the example of FIG. 9, some exemplary values of block mask value 161 are shown in the nine regions of the graph, which values may be stored in a lookup table. However, it should be appreciated that these values are examples, and different values may be selected depending on the implementation in which the techniques described herein are used.

One method for selecting the thresholds and region values of FIG. 9 is to determine them experimentally. To determine the thresholds and region values experimentally, one can start with a set of frames. The set of non-compressed frames may be encoded in the same manner that they would be encoded to compress them for transmission to produce a corresponding set of compressed frames. During the encoding process, the normalized activity value generated by the encoder may be recorded for each block of the frames.

The compressed frames may then be processed by system 100 of FIG. 1. During the processing of the compressed frames by system 100, the macro-block normalized activity value 123 and block texture value 124 may be recorded for each block of the frames.

The thresholds and region values of FIG. 9 may then be determined by comparing the recorded normalized activity value with the recorded macro-block normalized activity value and the recorded block texture value for each block of the frames. In one embodiment, thresholds and region values of FIG. 9 may be determined by displaying a three-dimensional graph of the encoder macro-block normalized activity values, the calculated macro-block normalized activity value, and the recorded block texture values, and then manually determining thresholds and region values to achieve a good fit to the data. In other embodiments, thresholds and region values may be determined by applying a parametric model to the data.

Figure 10:
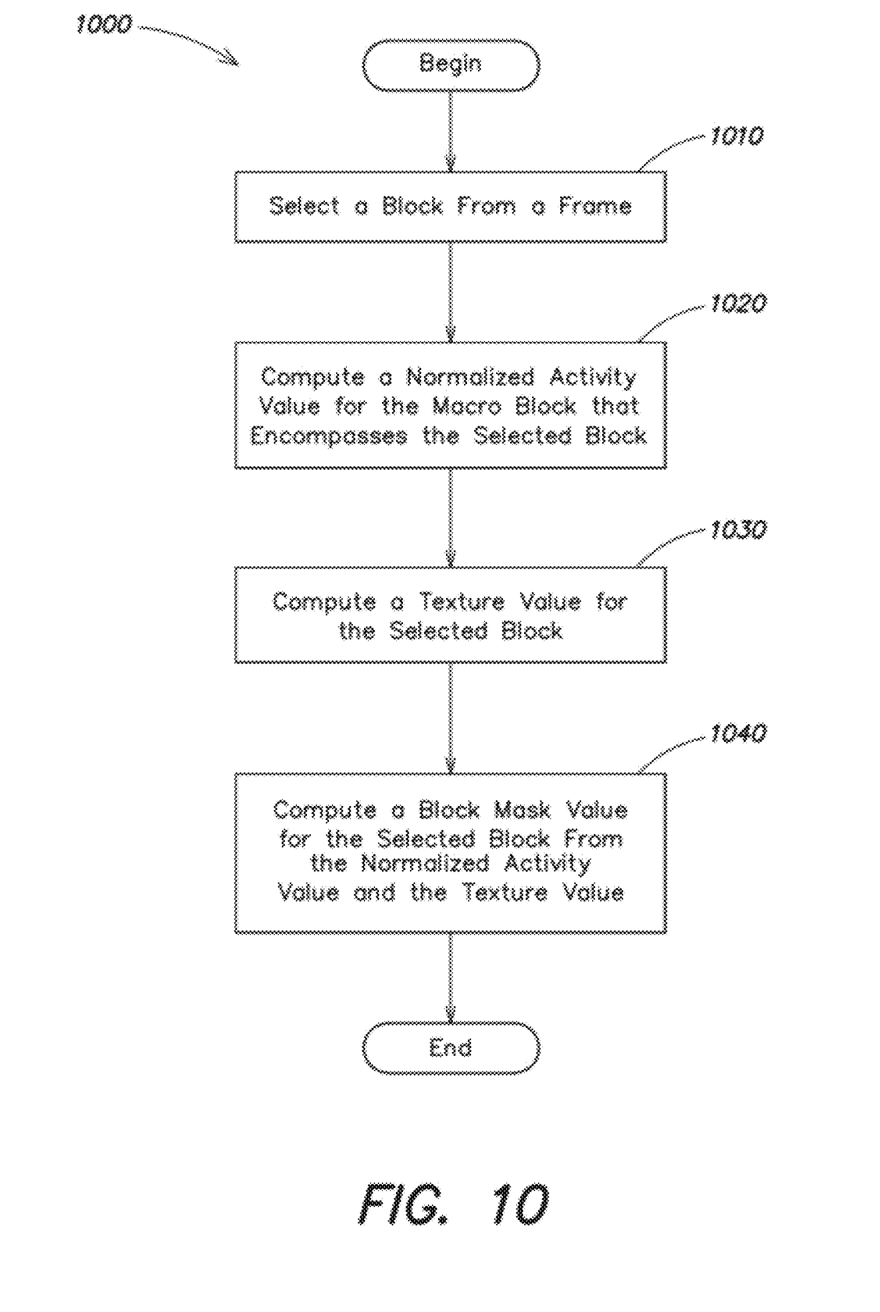
FIG. 10 is a flow chart of an illustrative process that may be used to determine the perceptibility of noise in a block in accordance with some embodiments.

FIG. 10 shows an example of a process that may be used to compute a block mask value in accordance with the techniques described above. The process of FIG. 10 begins at act 1010 where a block is selected from a frame. The block selector may be implemented in software or hardware.

The process continues to act 1020 where a macro-block-level normalized activity calculator is applied to the macro block encompassing the selected block and computes a normalized activity value for the macro block. The macro-block-level normalized activity calculator may be implemented in hardware or software, and exemplary implementations of a macro-block-level normalized activity calculator are described above.

The process continues to act 1030 where a block-level texture analyzer is applied to compute a texture value for the selected block. This block-level texture analyzer may be implemented in software or hardware, and exemplary implementations of a block-level texture analyzer are described above.

The process continues to act 1040 where a block masking generator is applied to compute a block mask for the selected block. This block masking generator may be implemented in software or hardware, and exemplary implementations of a block masking generator are described above.

Figure 11:
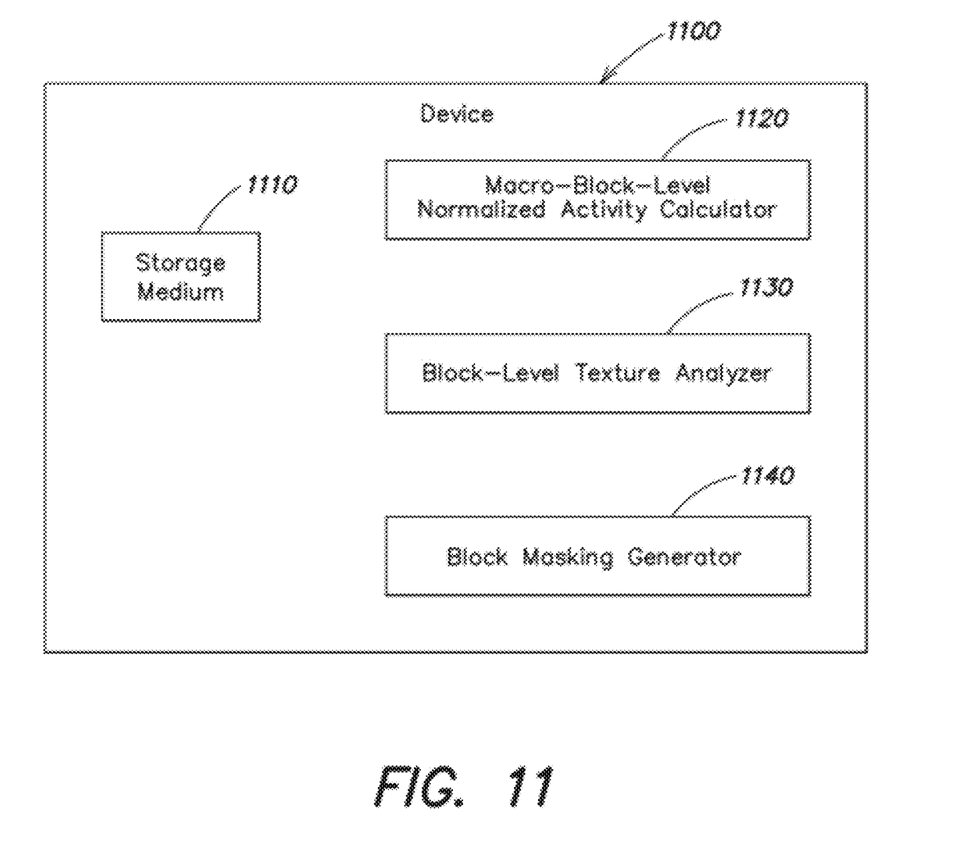
FIG. 11 shows an example of a device that may be used to determine the perceptibility of noise in a block in accordance with some embodiments.

FIG. 11 shows an example of a device 1100 that may be used to determine whether noise in a block is perceptible in accordance with the techniques described above. Device 1100 may be any device that processes or displays frames. For example, device 1100 may be a set-top box for cable television, a television, a DVD player, or a computer. Device 1100 may also comprise any components typically found in a set-top box for cable television, a television, a DVD player, or a computer. For example, device 1100 may comprise one or more processors, such as general purpose processors and specialized processors; circuitry, such as an integrated circuit, an application-specific integrated circuit, or a field-programmable gate array; one or more input and output devices, such as display screens, keyboards, and pointing devices; one or more components to connect to one or more wired or wireless networks; and one or more storage mediums, such as random access memory, read only memory, hard disk drives, optical discs, and flash memory.

Device 1100 may comprise a computer readable storage medium 1110. The storage medium may be a tangible, non-transitory, computer readable storage medium such as a memory or any other type of storage medium and may store a plurality of instructions that, when executed on one or more processors, implement any of the techniques described herein. Storage medium 1110 may also store one or more frames.

Device 1100 may also comprise a macro-block-level normalized activity calculator 1120 that may be applied to a macro block encompassing a block and computes a normalized activity value for the macro block. Macro-block-level normalized activity calculator 1120 may be implemented in software or hardware, and exemplary implementations of a macro-block-level normalized activity calculator are described above.

Device 1100 may also comprise a block-level texture analyzer 1130 that may be applied to compute a texture value of a block. Block-level texture analyzer 1130 may be implemented in software or hardware, and exemplary implementations of a block-level texture analyzer are described above.

Device 1100 may also comprise a block masking generator 1140 to compute a block mask for a block. Block masking generator 1140 may be implemented in software or hardware, and exemplary implementations of a block masking generator are described above.

Having thus described some illustrative embodiments of the invention, it should be apparent to those skilled in the art that the foregoing is merely illustrative and not limiting, having been presented by way of example only. Numerous modifications and other embodiments may be used that fall within the scope of the invention.

Use of ordinal terms such as "first," "second," "third," etc. in the claims to modify a claim element or item in the specification does not by itself connote any priority, presence or order of one element over another. In addition, the use of an ordinal term does not by itself connote a maximum number of elements having a certain name that can be present in a claimed device or method. Any suitable number of additional elements may be used unless a claim requires otherwise. Ordinal terms are used in the claims merely as labels to distinguish one element having a certain name from another element having a same name. The use of terms such as "at least one" or "at least a first" in the claims to modify a claim element does not by itself connote that any other claim element lacking a similar modifier is limited to the presence of only a single element. Any suitable number of additional elements may be used unless a claim requires otherwise. The use of "including," "comprising," or "having," "containing," "involving," and variations thereof herein, is meant to encompass the items listed thereafter and equivalents thereof as well as additional items.

What is claimed is:

1. A method for determining a perceptibility to a person of noise in an image frame, the image frame comprising a plurality of blocks, the method being implemented using a processor, the method comprising:
    selecting a block of the plurality of blocks;
    determining, for the block, a normalized activity value representing a complexity level of visual information in the block;
    determining a texture value for the block based on a size and/or number of image edges in the block; and
    determining a noise perceptibility value for the block using the normalized activity value for the block and the texture value for the block.

2. The method of claim 1, wherein the noise perceptibility value is determined using a lookup table.

3. The method of claim 2, wherein the step of determining the noise perceptibility value further comprises selecting a value in the lookup table so that the noise perceptibility value for the block is similar to a normalized activity value for the block computed during encoding of the frame.

4. The method of claim 1, wherein the normalized activity value represents a complexity level of visual information in the block normalized to a second complexity level of visual information over the image frame.

5. The method of claim 1, wherein the step of determining a texture value for the block comprises estimating the size of an edge in the block.

6. The method of claim 1, wherein the step of determining a normalized activity value for the block comprises computing the variance of each block in a macro-block comprising the selected block and selecting a minimum variance of the blocks in the macro-block.

7. The method of claim 1, wherein the block is a first block the texture value for the first block is determined using a second texture value for a second block neighboring the first block.

8. The method of claim 1, wherein the block is part of a macro. block.

9. The method of claim 1, wherein the block comprises an eight by eight square array of pixels.

10. The method of claim 1, wherein the image frame is a frame of video.

11. A device for determining a perceptibility to a person of noise in an image frame, the image frame comprising a plurality of blocks, the device comprising:
    at least one processor configured to:
        determine a normalized activity level for the block representing a complexity level of visual information in the block;
        determine a texture value for the block based on a size and/or number of image edges in the block; and
        determine a noise perceptibility value for the block using the normalized activity level for the block and the texture value for the block.

12. The device of claim 11, further comprising a lookup table storing values for determining the noise perceptibility value.

13. The device of claim 12, wherein the lookup table comprises values selected so that the determined noise perceptibility value for the block is similar to a normalized activity value for the block computed during encoding of the frame.

14. The device of claim 13, wherein
    the frame has previously been encoded using a process that computes the normalized activity value.

15. The device of claim 11, wherein the texture value is determined based at least in part on an edge magnitude.

16. The device of claim 11, wherein the normalized activity value is determined at least in part by calculating the variance of each block in a macro-block comprising the selected block and selecting a minimum variance of the blocks in the macro-block.

17. The device of claim 11, wherein the at least one processor is further configured to determine a second texture value for a second block neighboring the block.

18. The device of claim 11, wherein the block is part of a macro-block.

19. The device of claim 11, wherein the block comprises an eight by eight square array of pixels.

20. The device of claim 11, wherein the image frame is a frame of video.

21. A non-transitory computer-readable storage medium encoded with instructions that, when executed, perform a method for determining a perceptibility to a person of noise in an image frame, the image frame comprising a plurality of blocks, the method being implemented using a processor, the method comprising:
selecting a block of the plurality of blocks;
determining, for the block, a normalized activity value representing a complexity level of visual information in the block;
determining a texture value for the block based on a size and/or number of image edges in the block; and
determining a noise perceptibility value for the block using the normalized activity value for the block and the texture value for the block.

22. The non-transitory computer-readable storage medium of claim 21, wherein the noise perceptibility value is determined using a lookup table.

23. The non-transitory computer-readable storage medium of claim 22, wherein the step of determining the noise perceptibility value further comprises selecting a value in the lookup table so that the noise perceptibility value for the block is similar to a normalized activity value for the block computed during encoding of the frame.

24. The non-transitory computer-readable storage medium of claim 21, wherein the normalized activity value represents a complexity level of visual information in the block normalized to a second complexity level of visual information over the image frame.

25. The non-transitory computer-readable storage medium of claim 21, wherein the step of determining a texture value for the block comprises estimating the size of an edge in the block.

26. The non-transitory computer-readable storage medium of claim 21, wherein the step of determining a normalized activity value for the block comprises computing the variance of each block in a macro-block comprising the selected block and selecting a minimum variance of the blocks in the macro-block.

27. The non-transitory computer-readable storage medium of claim 21, wherein the block is a first block and the texture value for the first block is determined using a second texture value for a second block neighboring the first block.

28. The non-transitory computer-readable storage medium of claim 21, wherein the block is part of a macro-block.

29. The non-transitory computer-readable storage medium of claim 21, wherein the block comprises an eight by eight square array of pixels.

30. The non-transitory computer-readable storage medium of claim 21, wherein the image frame is a frame of video.

* * * * *

UNITED STATES PATENT AND TRADEMARK OFFICE
CERTIFICATE OF CORRECTION

PATENT NO. : 8,811,766 B2
APPLICATION NO. : 13/332949
DATED : August 19, 2014
INVENTOR(S) : Anna Raffalli et al.

It is certified that error appears in the above-identified patent and that said Letters Patent is hereby corrected as shown below:

In the Claims:

In Column 12, Lines 26 and 27, Claim 8, "macro- :$_{block}$" should read --macro- block--.

Signed and Sealed this
Fourth Day of November, 2014

Michelle K. Lee
*Deputy Director of the United States Patent and Trademark Office*